Figure 1:
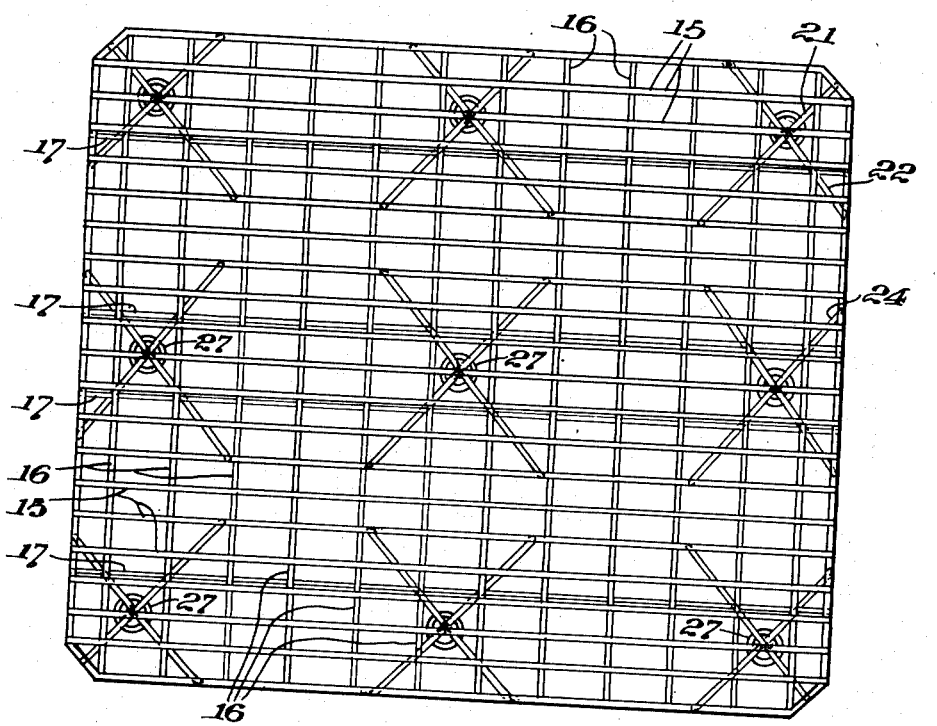

Sept. 15, 1953                     O. F. ARTHUR                    2,652,219
                                 PORTABLE PLATFORM
Filed Sept. 18, 1948                                              7 Sheets-Sheet 1

INVENTOR.
OSCAR F. ARTHUR.
BY Archworth Martin
his ATTORNEY.

Sept. 15, 1953     O. F. ARTHUR     2,652,219
PORTABLE PLATFORM

Filed Sept. 18, 1948     7 Sheets-Sheet 2

INVENTOR.
OSCAR F. ARTHUR.
BY Archworth Martin
his ATTORNEY.

Sept. 15, 1953  
O. F. ARTHUR  
PORTABLE PLATFORM  
2,652,219

Filed Sept. 18, 1948

7 Sheets-Sheet 4

INVENTOR.  
OSCAR F. ARTHUR.  
BY Archworth Martin  
his ATTORNEY.

Sept. 15, 1953              O. F. ARTHUR              2,652,219
PORTABLE PLATFORM Filed Sept. 18, 1948                            7 Sheets-Sheet 5

INVENTOR.
OSCAR F. ARTHUR.
BY *Archworth Martin*
his
ATTORNEY.

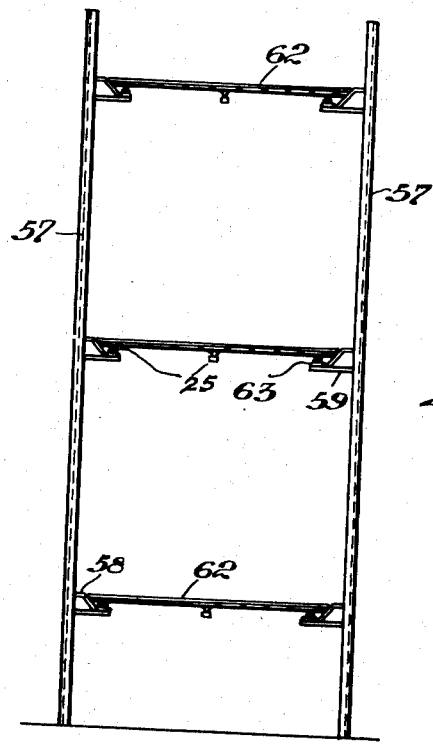
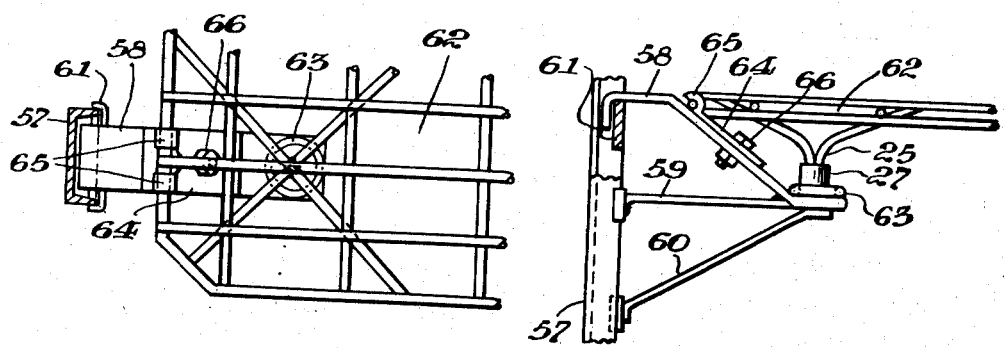

Sept. 15, 1953        O. F. ARTHUR        2,652,219
PORTABLE PLATFORM

Filed Sept. 18, 1948        7 Sheets-Sheet 7

INVENTOR.
OSCAR F. ARTHUR.
BY Archworth Martin
his ATTORNEY.

Patented Sept. 15, 1953

2,652,219

UNITED STATES PATENT OFFICE 2,652,219

PORTABLE PLATFORM

Oscar F. Arthur, Connellsville, Pa., assignor to Tri-State Engineering Company, Washington, Pa., a corporation of Maryland Application September 18, 1948, Serial No. 49,907

3 Claims. (Cl. 248—120)

My invention relates to portable transfer and storage decks which may also be used as shelving or as pallets, for transportation and handling by lift-fork trucks.

One object of my invention is to provide a portable deck or shelf having legs of such form and so arranged as to provide a greater stiffening effect against vertical deflections under load, when used with deck sheets or deck mesh of a given weight.

Another object of my invention is to provide a deck leg structure of such form as to have adequate spread at the upper ends of the legs for supporting the deck efficiently against deflection under load, but with maximum of clearance between the lower portions of the legs for entry of lift forks beneath the deck.

Another object of my invention is to provide a leg arrangement of such form for supporting a deck upon a base that the deck and the base can be disconnected when the base is not needed, or for more compact stowage of the deck and the base members when making shipments thereof, in an "empty" or unloaded condition.

Another object of my invention is to provide a leg structure of the character referred to of such form that the legs can be more cheaply made and so placed in position against the deck and the base that the points of weld connection to the base are more accessible to welding tools, thus greatly simplifying and cheapening the assembly cost of the decks and bases.

Another object of my invention is to provide a combined portable deck and base structure of such form that the deck can readily be applied to the base, and the base having means thereon for conveniently connecting casters or rollers thereto.

Still another object of my invention is to provide an improved form of base of the type referred to which can readily be pulled along a floor after the manner of a sled.

A further object of my invention is to provide portable platforms or decks of such form that they can be readily stacked on supporting racks in storage or for transportation in railway cars and trucks.

Figure 2:
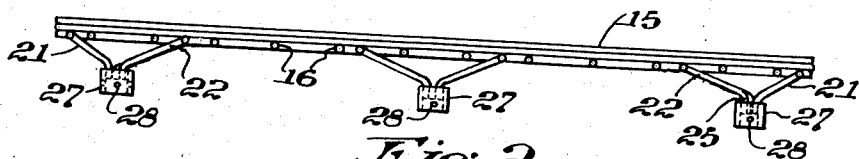
Figure 3:
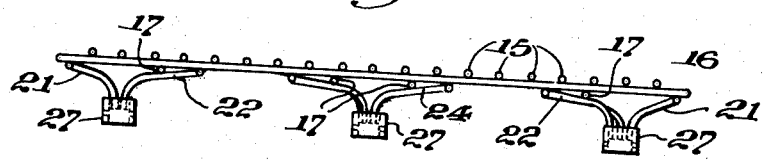
Figure 4:
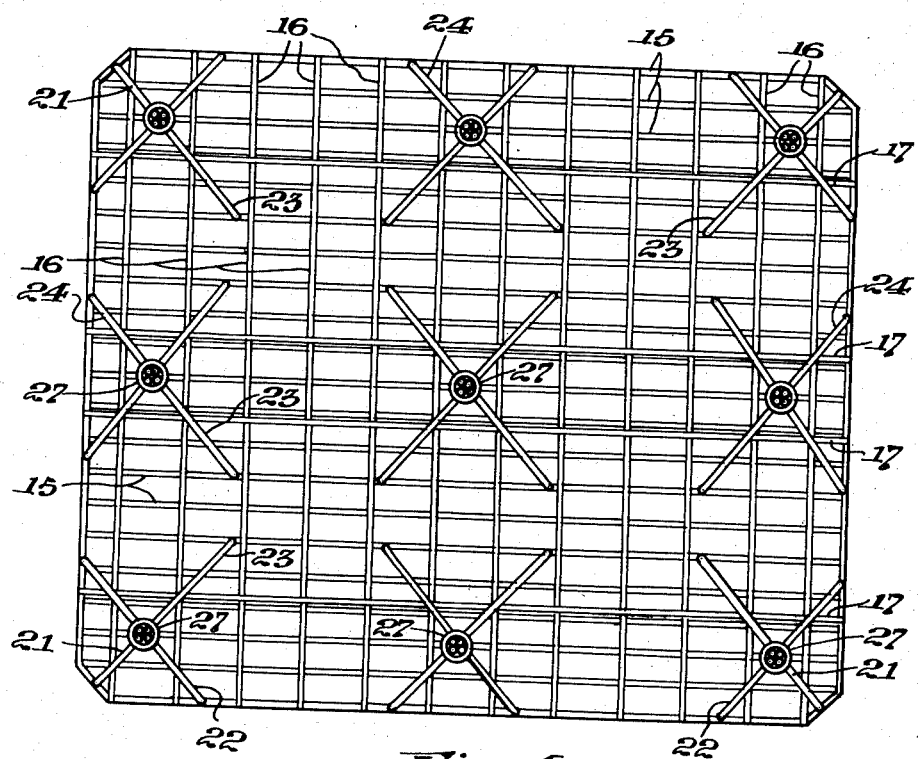
Figure 5:
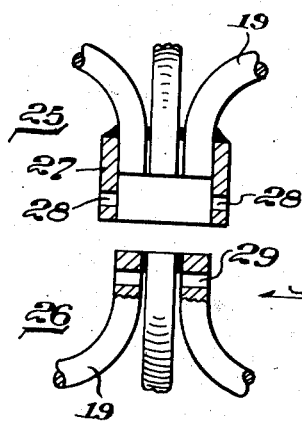
Figure 6:
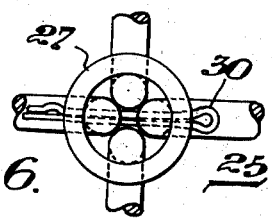
Figure 7:
Figure 8:
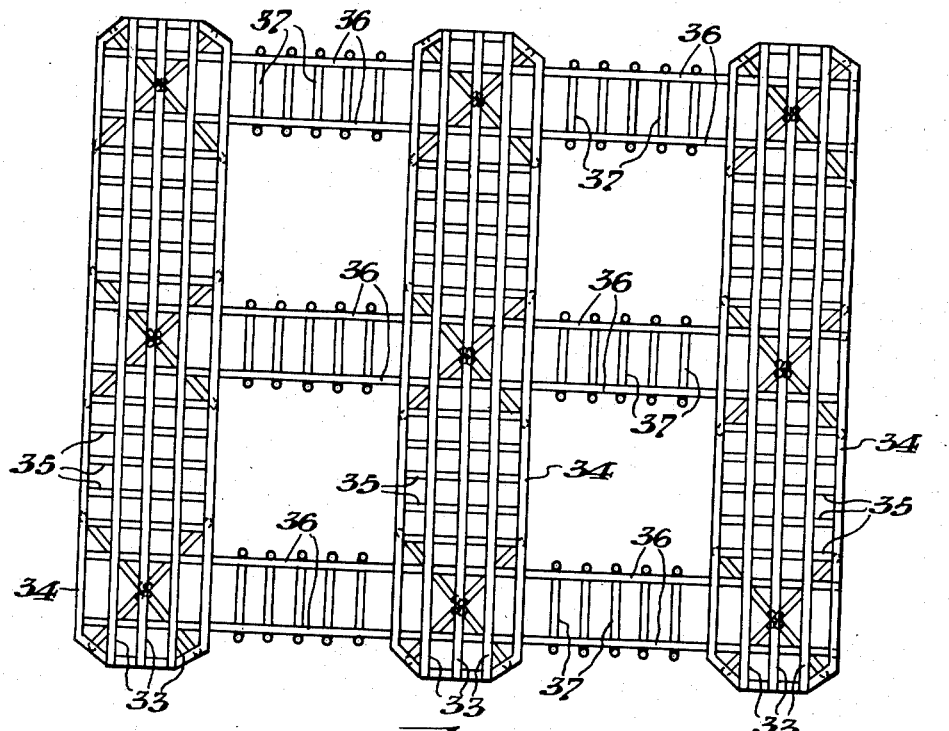
Figure 9:
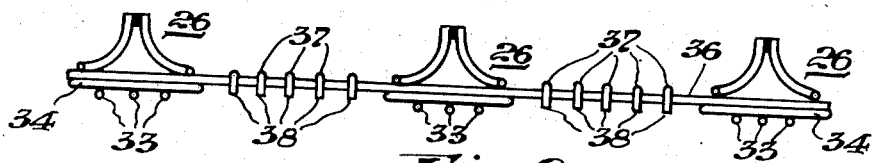
Figure 10:
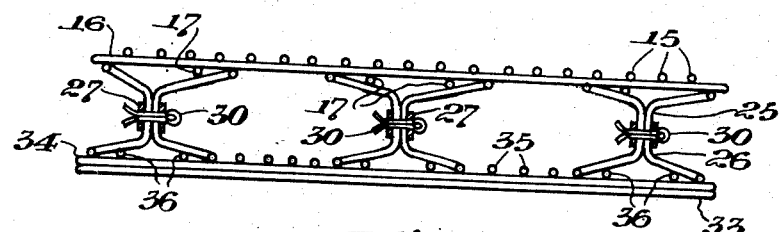
Figure 11:
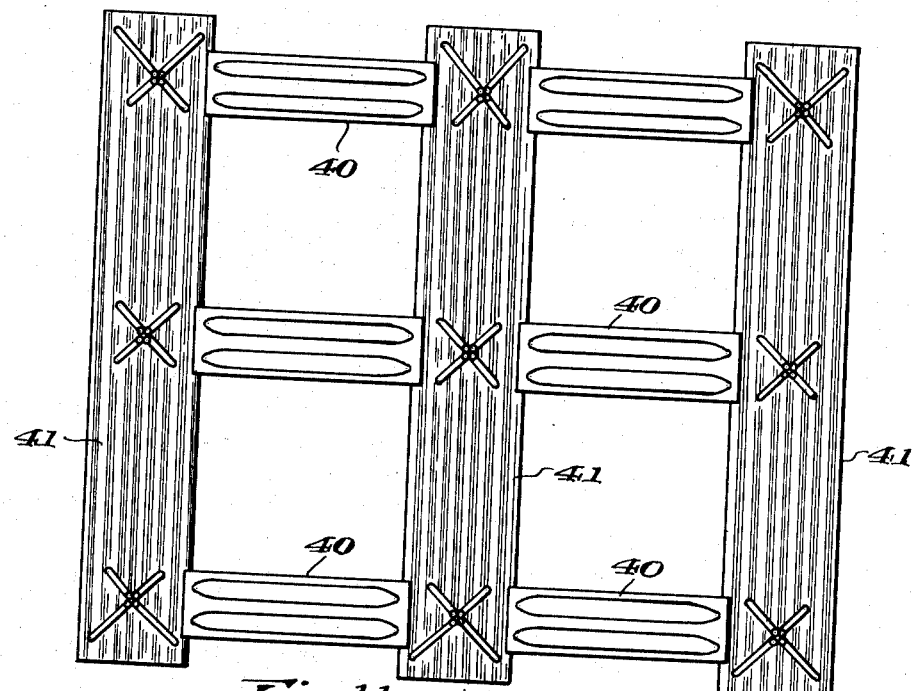
Figure 12:
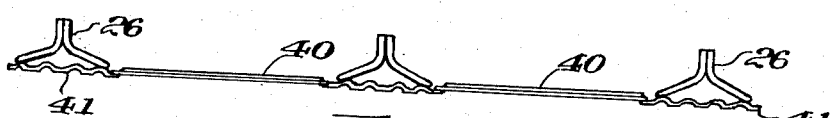
Figure 13:
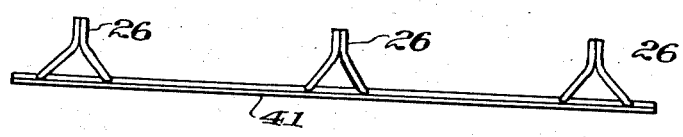
Figure 14:
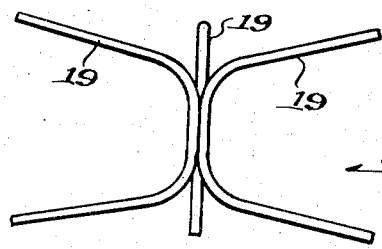
Figure 15:
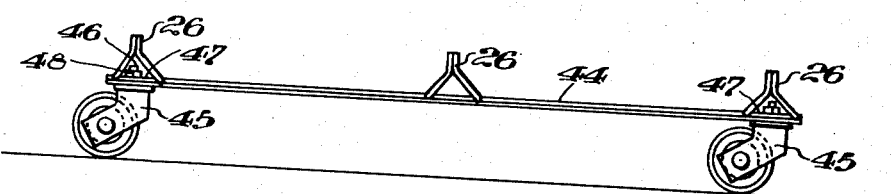
Figure 16:
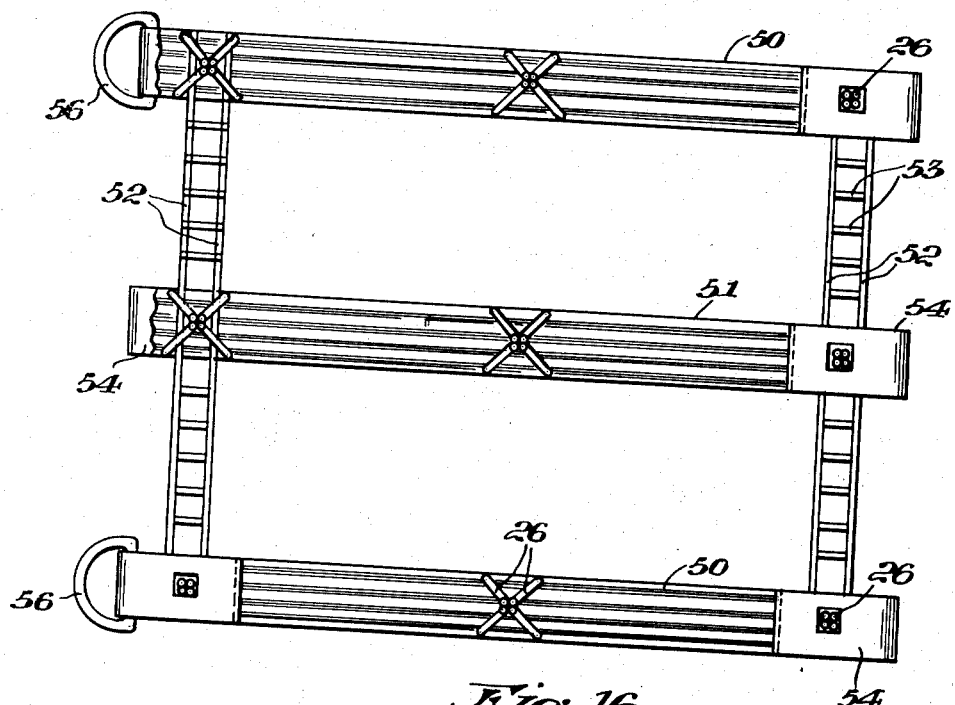
Figure 17:
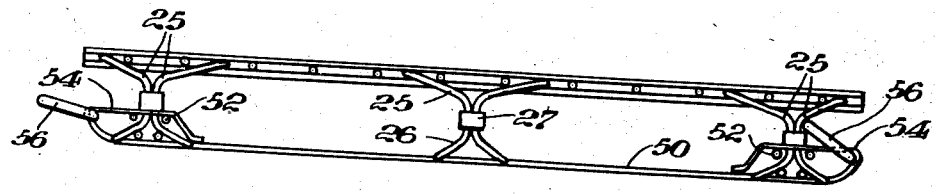
Figure 21:
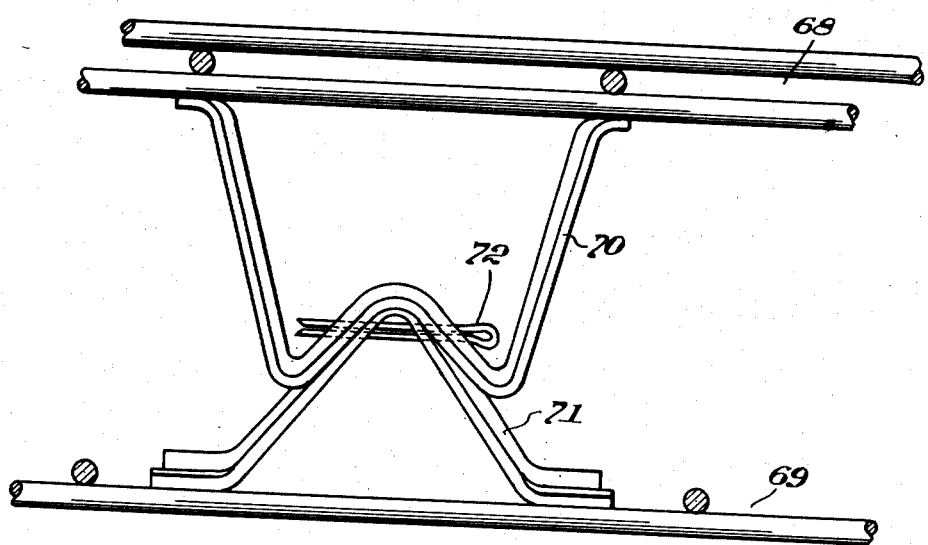
Figure 22:
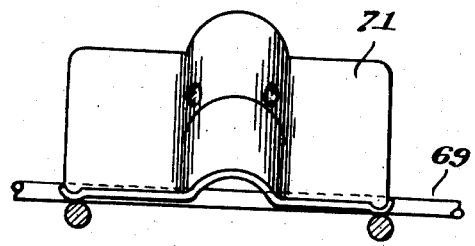
Figure 24:
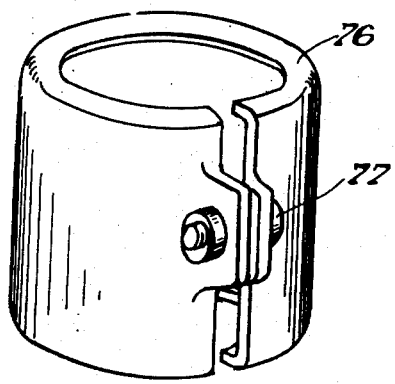
Figure 23:
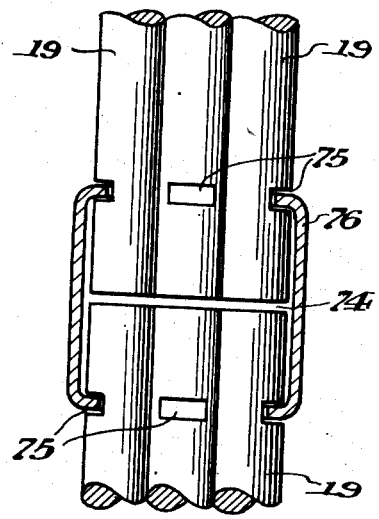

Some of the forms which my invention may take are shown in the accompanying drawings, wherein Figure 1 is a plan view of a portable deck; Fig. 2 is a side view thereof; Fig. 3 is an end view thereof; Fig. 4 is an inverted plan view of the structure of Fig. 1; Fig. 5 is an enlarged view showing details of the upper and lower leg sections, for the deck and a base respectively; Fig. 6 is a horizontal view showing the manner in which the leg members of Fig. 5 are detachably connected to one another; Fig. 7 is a perspective view of the key for connecting these upper and lower leg members; Fig. 8 is an inverted plan view of a base which may be used with the deck of Figs. 1 to 4; Fig. 9 is a side view thereof in upright position; Fig. 10 is an end view thereof, showing also the manner in which the deck of Fig. 1 may be mounted upon this base; Fig. 11 is a plan view showing a modification of the base of Figs. 8 to 10; Fig. 12 is a side view thereof; Fig. 13 is an end view thereof; Fig. 14 shows certain of the leg members of Fig. 10 at a preliminary stage of manufacture; Fig. 15 is a side elevational view of a wheeled base for receiving portable decks or pallets; Fig. 16 is a plan view of another form of a base that can be pulled along a floor; Fig. 17 is a side view thereof; Fig. 18 is a view of a storage rack for supporting the portable decks of the various other figures; Fig. 19 is an enlarged plan view of a portion of the structure of Fig. 1; Fig. 20 is a view partly in section and partly in elevation of the structure of Fig. 19; Fig. 21 is a side elevational view showing a modification of the leg structure of Figs. 5 and 10; Fig. 22 is a perspective view, partly in plan, of the lower portion of the structure of Fig. 21; Fig. 23 is a vertical sectional view showing a modification of the structure of Figs. 5 and 10 for connecting the upper leg elements to the lower leg elements, and Fig. 24 is a perspective view of the coupling sleeve or clamp of Fig. 23.

Referring first to Figs. 1 to 4, the deck comprises longitudinal wires 15 superimposed and welded to transverse wires 16. Reinforcing rods 17 are welded to the undersides of the wires 16.

The legs for the deck and for the base are each formed of a group of four rods 19 bent to somewhat roughly C-form and welded together at their mid portions as shown in Fig. 14. The upper ends of some of these rods are usually made of greater length than the other ends, the shorter portions of the rods being positioned to support the edges and corners of the deck as shown more clearly for example at 21 and 22. The longer portions such as 23 extend well beneath the deck and underlie the reinforcing rods 17 to give greater stiffness to the adjacent deck areas, the rods 17 filling the spaces that would otherwise exist between these sloping portions 23 of the legs and the deck. The shorter legs as at 21, 22 and 24 stiffen the corners and edges of the deck against deflection under loads.

In making the legs, a number of bent rods 19 can be assembled as shown in Fig. 14, and welded together, the rods initially having their upper ends cut to the desired ultimate lengths or all of the same length, and certain of them cut to shorter lengths as at 21, 22 and 24 for example, to the desired length. Thereafter, the rods are cut apart on a horizontal plane to form upper and lower leg portions 25 and 26 as indicated in Fig. 5. A sleeve 27 is placed around the upper group of rods and welded thereto, holes 28 being drilled through the sleeve, and holes 29 are drilled through the group of rods forming the lower leg members, so that when it is desired to use the deck with a base, the upper legs 25 can be placed on the lower leg members 26 and a key 30 or other retaining member inserted in the holes 29—29 to hold the deck and the base in assembled relation. It is preferable to place the sleeve 27 on the upper leg member because it will frequently rest upon a floor when supporting a load on the deck in the absence of the base.

Where it is desired to make an ordinary pallet with the base permanently attached thereto, the upper and lower leg members can, of course, be welded together. In such instance, it is still advantageous to initially assemble the legs as in Fig. 14 and then cut them apart, because the upper leg portions can then be more readily welded to the deck sheet when it is in inverted position as in Fig. 4, since the points of weld of the legs to the deck wires and the reinforcing rods 17 will be readily accessible to a welding tool. This convenience of assembly will apply also when welding the lower leg sections 26 to the base.

The base comprises mesh sheets each formed of floor-engaging bars or rods 33 welded to the base bars 34, there being cross bars 35 welded to the bars 33 and 34. Tie strips comprising rods 36 having cross bars 37 welded thereto are welded to the upper sides of the rods 34. The ends of the bars 37 are bent vertically as shown more clearly at 38 in Fig. 9 to avoid ragged or squared ends that would perhaps interfere with the entry of lifting forks and which also give additional vertical support to the base when they engage the floor. The lower ends of the legs are flared on curved or sloping lines and are welded to the base strips.

While the deck can readily be used as a storage shelf, where it has shelf bars for supporting its ends, it can also be handled by a lift fork on a warehouse floor after the manner of portable decks or pallets. However, when handling soft lading such as bagged material which is to be stacked, the decks will be assembled on bases as shown in Fig. 10. When the decks and bases are to be returned in an unloaded condition to the original shipper, the keys 31 will be removed, and the decks and bases nested to some extent by shifting the upper leg members 25 into offset position with respect to the leg members 26, thus saving shipping space.

Referring now to Figs. 11 to 13, I show a modified form of base formed of sheet metal strips or plates. In this case, I show longitudinal sheet metal strips 40 having welded connection with transverse strips 41 and 42. The strips 40—41 are ribbed for strength, and also have greater bearing area (in this case about 60% of the overall base area) than the mesh base, which makes the base particularly desirable for stacking on soft lading such as bagged material. The leg members 26 that are welded to these strips are of substantially the same form as in Figs. 9 and 10, except that the lower ends of the rods are shorter and not so greatly flared. The deck and its leg members 25 can be placed on these leg members in the same manner as shown in Fig. 10.

In Fig. 15, I show a base equipped with casters that may conveniently be attached thereto and removed therefrom. The base may be of one of the forms shown in Figs. 8 and 11 and is here designated by the numeral 44, provided with leg elements 26. Casters 45 have vertical spindles or stems 46 that extend through plates 47 at each corner of the base, the upper ends of the spindles 46 being threaded for connection to nuts 48. The plates 47 may suitably be welded to the upper face of the base at points between the corner leg members.

Referring now to Figs. 16 and 17, I show a modification of the structure of Figs. 11 and 15. In this arrangement, longitudinally-extending base plates 50 and 51 are welded to laterally-extending tie bars 52 that are stiffened by cross bars 53 welded thereto. The ends of the plates 50—51 are bent upwardly and backwardly at 54 to sled-runner form, they extending above and being welded to the cross bars 52. The leg members 26 extend upwardly for connection to the leg members 25 of the deck or platform as in Fig. 10 for example. Towing rings or loops 56 are loosely mounted in the turn-back runner members 54 for the hitching of tow ropes thereto.

In Figs. 18, 19 and 20, I show a manner in which the portable platforms of the other figures may be stacked on racks in warehouses or in freight cars. In this case, uprights 57 which may be used in warehouses or cars and may be connected in unitary relation or fastened to the permanent side walls, have bracket members secured thereto. These brackets each comprises a hook member 58, a brace member 59 and a brace member 60 all welded together. The brace member 60 can be dispensed with where the loads to be supported are not so great, as indicated in Fig. 18. The members 58 have hooked engagement with the cross bar 61 of the upright channels 57.

The leg members 25—27 of a deck 62 will rest upon the bracket arm 59 and be held against sliding movement thereon by a retaining ring 63 that is welded to such arm. Where the racks are placed in freight cars and the decks subjected to shocks in transportation, anchoring plates 64 are provided to firmly hold the deck 62 in place, the upper end of the plate being bent at 65 to partly embrace the adjacent marginal rod of the deck 62. The plate is held in place on the bracket bar 58 by a bolt 66. It will be understood that one of these clamping devices will be provided at each corner of the deck.

In Figs. 21 and 22, I show a modified arrangement of leg or spacer structure with a platform or deck 68 and a base 69 to which spacers or leg elements 70 and 71 are respectively welded. These spacer or leg elements are used instead of the upper and lower leg elements 25 and 26 of Figs. 5 and 10 and are in the form of sheet metal strips bent and welded to the deck and the base. Interfitting portions of the member 70 and 71 are releasably connected by a cotter pin 75 that extends through holes therein, to permit use of the platform independently of the base.

Referring now to Figs. 23 and 24, another manner of connecting the rod-like elements of Figs. 5 and 14 is shown. The upper and lower leg members 19 may be bent laterally in like manner to Fig. 14, after welding, and will then be cut apart at 74 and notched at 75 to receive the flanges of a coupling sleeve 76 which will be releasably held in gripping engagement with the legs by a bolt 77.

I claim as my invention:

1. A portable platform comprising a deck, and legs each having a plurality of rod-like elements arranged in grouped formation and secured together at their lower ends, the upper ends of the elements being relatively flared and securing to the deck, a base having upwardly-extending supporting elements secured thereto in position to serve as leg extensions of the first-named legs, means for detachably securing vertically-alined upper and lower leg members together, the said means each comprising a sleeve rigidly connected to one group of leg members, in position to receive the ends of the other group of leg members, and locking members removably connecting the last-named leg members to the sleeves.

2. A portable platform comprising a deck, a base therefor, legs each formed of elements extending downwardly from a plane between the deck and the base and secured at their lower ends to the base and elements sloped upwardly from said plane and having their upper ends secured to the deck, means at said plane for effecting a telescopic connection between the upper and lower leg elements of each leg, and locking members removably holding the leg elements in generally end-to-end relation at the zones of telescopic connection, the telescopic connection comprising a split sleeve that embraces the upper and lower leg elements, near their opposed ends, and having inturned flanges that engage notches in said elements.

3. A portable platform comprising a deck, and legs each having a plurality of rod-like elements arranged in grouped formation and secured together at their lower ends, the upper ends of the elements being relatively flared and secured to the deck, a base having upwardly-extending supporting elements secured thereto in position to serve as leg extensions of the first-named legs, means for detachably securing vertically-alined upper and lower leg members together, the said means each comprising a sleeve-like coupling member into which the adjacent ends of the upper and lower leg members extend, and locking devices for releasably holding the coupling member and the leg members in assembled relation.

OSCAR F. ARTHUR.

References Cited in the file of this patent

UNITED STATES PATENTS

| Number | Name | Date |
|--------|------|------|
| 777,037 | Liebaw | Dec. 6, 1904 |
| 1,015,183 | Hering | Jan. 16, 1912 |
| 1,879,214 | Hollowell | Apr. 27, 1932 |
| 2,233,303 | Bergen | Feb. 25, 1941 |
| 2,297,347 | Cruickshank | Sept. 29, 1942 |
| 2,330,852 | White | Oct. 5, 1943 |
| 2,393,439 | White et al. | Jan. 22, 1946 |
| 2,446,634 | Coit | Aug. 10, 1948 |
| 2,450,848 | Wisberger | Oct. 5, 1948 |

OTHER REFERENCES

Advertisement of Union Steel Products Co., p. 6, "The Palletizer" magazine for May 1946 (copy in Div. 52).